US008251347B2

(12) United States Patent
Schmit et al.

(10) Patent No.: US 8,251,347 B2

(45) Date of Patent: Aug. 28, 2012

(54) HIGH PRESSURE DIAPHRAGM VALVE WITH EXCHANGEABLE SEAT ASSEMBLY

(75) Inventors: Jeannot Schmit, Lintgen (LU); Paul Kremer, Helmsange (LU)

(73) Assignee: Luxembourg Patent Company S.A., Luxembourg (LU)

( * ) Notice: Subject to any disclaimer, the term of this patent is extended or adjusted under 35 U.S.C. 154(b) by 282 days.

(21) Appl. No.: 12/664,407

(22) PCT Filed: Jun. 12, 2008

(86) PCT No.: PCT/EP2008/057424

§ 371 (c)(1), (2), (4) Date: Apr. 19, 2010

(87) PCT Pub. No.: WO2008/152110

PCT Pub. Date: Dec. 18, 2008

(65) Prior Publication Data

US 2011/0140014 A1 Jun. 16, 2011

(30) Foreign Application Priority Data

Jun. 12, 2007 (EP) .................................... 07110131

(51) Int. Cl.
*F16K 7/00* (2006.01)

(52) U.S. Cl. ...................... 251/331; 251/335.2; 251/362

(58) Field of Classification Search .................. 251/331, 251/335.2, 360-363
See application file for complete search history.

(56) References Cited

U.S. PATENT DOCUMENTS 4,867,201 A * 9/1989 Carten ...................... 251/335.2
5,108,069 A * 4/1992 Tada et al. ...................... 251/58
5,215,286 A 6/1993 Kolene
6,105,933 A * 8/2000 Kanno et al. .................. 251/331
6,786,471 B2 * 9/2004 Nakata et al. ................. 251/362
2003/0025099 A1 * 2/2003 Nakata et al. ................. 251/331
2006/0214130 A1 * 9/2006 Tanikawa et al. ............. 251/331

FOREIGN PATENT DOCUMENTS

DE 10341175 5/2005
EP 1281898 A2 2/2003
GB 712856 8/1954
GB 2078344 1/1982

OTHER PUBLICATIONS

International Search Report PCT/EP2008/057424; Dated Oct. 10, 2008.

* cited by examiner

*Primary Examiner* — John Bastianelli

(74) *Attorney, Agent, or Firm* — Cantor Colburn LLP

(57) ABSTRACT

A high pressure diaphragm gas valve comprises a removable seat assembly (32), including a mounting ring (34) and a synthetic seat ring (36), which is fitted in a central seat hole of a mounting ring (34). A nozzle (60) penetrates in a sealed way into a central through hole (38) of the synthetic seat ring (36). A first gas port (28) is arranged in a front face (62) of the nozzle (60). A second gas port is formed by a gas collecting ring channel (30) incorporated into the valve body (12), wherein it surrounds a nozzle shoulder surface (64) of the nozzle (60) and is itself surrounded by an outer shoulder surface (102) of the valve body (12). The mounting ring (34) is supported with an inner ring flange (82) on the nozzle shoulder surface (64) and with an outer ring flange (84) on the outer shoulder surface (102), so that peripheral gas passages (86) open into the ring channel (30).

15 Claims, 3 Drawing Sheets

50 24 20 82 88 40 98 100 28 62 92 68 70 44 108 32 110 104 46 106 26 86 16 86 84 34 22 76 90 64 66 36 56 48 60 74 38,72 94 96 80 30 102

HIGH PRESSURE DIAPHRAGM VALVE WITH EXCHANGEABLE SEAT ASSEMBLY

TECHNICAL FIELD

The present invention generally relates to a high pressure diaphragm gas valve with an exchangeable seat assembly.

BACKGROUND ART

High pressure diaphragm valves with an exchangeable seat assembly are e.g. used as gas cylinder valves or as shut-off valves for high pressure toxic, corrosive, highly oxidizing or highly flammable gases, but also for high pressure inert gases. They show an excellent gas tightness and resistance to such high pressure gases.

Such a high pressure diaphragm valve with an exchangeable seat assembly is e.g. disclosed in U.S. Pat. No. 5,215,286. It comprises a valve body having therein a valve chamber of a generally cylindrical configuration. This valve chamber has at one end a flat bottom surface with a central gas inlet port and a lateral gas outlet port therein. A flexible multi-layer diaphragm seals the opposite end of the valve chamber. A seat assembly, including a metal mounting ring and synthetic seat ring, is removably fitted in the valve chamber. The mounting ring has a central, cylindrical seat hole, an outer ring flange and a plurality of circumferentially spaced through openings arranged between the seat hole and the outer ring flange. The synthetic seat ring is fitted in the central seat hole of the mounting ring. It is a cylindrical body with a ring flange at its foot end and a central through hole. The foot end with the ring flange forms a seat ring foot surface that is pressed by the mounting ring onto the flat bottom surface around the central gas inlet port, wherein an inner flange of the mounting ring overlies the ring flange of the synthetic seat ring and compresses the latter. The other end of the synthetic seat ring forms a funnel-shaped seat surface in the valve chamber. A thin-walled rigid metal sleeve is closely received within the seat ring and rests with one end on the bottom surface of the valve chamber, wherein the funnel-shaped seat surface protrudes over the other end of the metal sleeve. The rigid metal sleeve and the mounting ring closely engage about the interior and exterior of the seat ring to prevent radial deformation and axial deflection of the latter when the seat surface is engaged by the diaphragm. With the help of a sleeve or bonnet member, the outer rim of the diaphragm is clamped about its periphery to an upwardly extending sealing bead on the outer ring flange of the mounting ring, whereby the outer ring flange of the mounting ring is simultaneously pressed with a downwardly extending sealing bead onto the bottom surface of the valve chamber. Between the mounting ring and the flat bottom surface of the valve chamber remains an annular gas collecting space that is radially delimited by the ring flange of the synthetic seat ring and the downwardly extending sealing bead of the mounting ring. When the valve is open, gas flows through the central gas inlet port, traverses the seat ring through the metal sleeve, flows over the seat surface of the seat ring, enters through the through openings in the mounting ring into the annular gas collecting space, to finally enter into the lateral outlet port, which opens into this annular gas collecting space. Actuating means, including a push rod and an actuator button, allow to selectively deflect the diaphragm into engagement with the seat surface, so as to close the valve.

It will be noted that the valve disclosed in U.S. Pat. No. 5,215,286 has however several drawbacks. It will for example be appreciated that mounting a thin rigid metal sleeve into a through-hole of a synthetic seat ring is not very easy, in particularly not within the context of an automated production process of the seat assembly. Furthermore, a metal sleeve that is not well fixed in the synthetic seat ring may damage the synthetic seat ring or the diaphragm when the valve is closed or it may be ejected into the valve chamber, if a high velocity gas stream passes through the central gas inlet port. It will also be appreciated that, gas tightness of this prior art valve at very high pressures is largely dependent on the gas tightness that is achieved between the foot surface of the seat ring and the bottom surface around the central gas inlet port.

The aforementioned drawbacks are partially overcome with an exchangeable seat assembly as disclosed in EP-A-1281898. In this prior art valve, the metal sleeve in the seat ring is replaced by a protruding thin rim portion formed directly on the valve body. This rim portion and the mounting ring define a recess in which the synthetic valve seat is received. The bottom surface of the valve chamber includes a seat supporting surface surrounding the rim portion and a recessed channel surrounding the seat supporting surface. One end of the mounting ring is fitted into the recessed channel where it bears on the annular bottom surface of the latter. An annular recess in the surface of the mounting ring facing the annular bottom surface of the recessed channel serves as gas collecting space. The inner flange of the mounting ring overlies the ring flange of the synthetic seat ring and presses the latter onto the seat supporting surface.

It has to be pointed out that the valve disclosed in EP-A-1281898 still has e.g. the following drawbacks. First, one has to respect relatively narrow manufacturing tolerances for the recessed channel in the valve body, the seat support surface, the seat ring and the mounting ring, in order to achieve the required gas tightness without damaging the synthetic seat ring. Second, the annular recess in the lower surface of the mounting ring, which serves as gas collecting channel, substantially weakens the mounting ring, which may result in deformations of the mounting ring affecting gas tightness and possibly causing the whole valve to be ruined. Third, the ring flange of the seat ring is easily damaged during assembly of the valve and when the valve is subjected to excessive closure forces. Fourth, the seat ring too risks to be damaged when the valve is subjected to excessive closure forces. Fifth, the design of the valve seat is not really adapted for withstanding adiabatic shock tests with high pressure oxygen.

BRIEF SUMMARY to the disclosure provides a high pressure diaphragm gas valve with a removable seat assembly that is easier to manufacture and in which the risk of damaging the removable seat assembly during assembly of the valve is reduced.

The disclosure further provides a high pressure diaphragm gas valve with a removable seat assembly, in which the latter risks less being damaged, when the valve is subjected to excessive closure forces.

The disclosure additionally provides a high pressure diaphragm gas valve with a removable seat assembly that warrants a better gas tightness, in particular at higher gas pressures.

Still further, to the disclosure provides a diaphragm gas valve that is particularly well suited for high pressure oxygen.

A high pressure diaphragm gas valve concerned by the present invention generally comprises a valve body, an exchangeable seat assembly, a diaphragm and means for pressing a central sealing surface of the diaphragm onto a seat surface of the seat assembly. The valve body has therein a valve chamber of generally cylindrical configuration, with a first end and a second end that is axially spaced from the first end. A nozzle axially protrudes from the first end into the valve chamber, wherein a first gas port is arranged in a front face of this nozzle and a second gas port is arranged in the first end laterally of the nozzle. A seat assembly, including a mounting ring and a synthetic seat ring, is removably fitted in the first end of the valve chamber. The mounting ring has a central seat hole, an inner flange, a main ring body with at least one peripheral gas passage therein and an outer ring flange. The synthetic seat ring is fitted in the central seat hole of the mounting ring and has a central through hole therein. A front face of the seat ring forms a seat surface in the valve chamber around the first gas port. The nozzle penetrates in a sealed way into the central through hole of the synthetic seat ring. The latter has, at the opposite side of the seat surface, a seat ring foot surface that is pressed by the mounting ring onto the nozzle shoulder surface. Peripheral sealing means are provided along the outer ring flange of the mounting ring. The diaphragm seals off the second end of the valve chamber and has an outer rim in sealing engagement with the peripheral sealing means of the seat assembly.

In accordance with a first aspect of the present invention, the second gas port is formed by an ring channel incorporated into the valve body, wherein it surrounds the nozzle shoulder surface and is itself surrounded by an outer shoulder surface, the mounting ring being supported with its inner ring flange on the nozzle shoulder surface and with its outer ring flange on the outer shoulder surface, so that the at least one peripheral gas passage opens into the ring channel. In other words, the gas collecting channel is no longer incorporated into the mounting ring, but into the valve body, wherein the mounting ring bridges this channel, bearing with its outer and inner flanges on the external and internal borders of the latter. It will be appreciated that this modification results in many advantages. For example: the manufacturing and assembly of the valve body and mounting ring gets easier; a better seating of the mounting ring in the valve body is achieved, thereby also achieving a better gas tightness; the mounting ring is less exposed to deformations, when the valve is assembled or when it is subjected to excessive closure forces; and, last but not least, a gas collecting ring channel with a bigger cross-section, i.e. a bigger volume, may be easily provided without weakening the mounting ring. Such bigger volume gas collecting ring channel surrounding the base of the nozzle in the valve body has a positive effect on the behavior of the valve in adiabatic shock tests with high pressure oxygen, because it reduces the risk that the nozzle overheats to an extent which may damage the synthetic seat ring in direct contact with the nozzle.

The front face of the nozzle is normally only slightly recessed with regard to the seat surface so as to provide an abutment surface for the central sealing surface of the diaphragm close to the seat surface. Such an abutment surface close to the deformable seat surface protects the synthetic seat ring and the diaphragm against over-deformation and damages in case an excessive closer torque is applied to the valve. It will be noted in this context that the thin rim portion disclosed in EP-A-1281898 would be far too weak to provide such a mechanical stop for the diaphragm. The thin rim portion disclosed in EP-A-1281898 even risks to damage the diaphragm in case an excessive closer torque is applied to the valve.

In a preferred embodiment of the valve, the synthetic seat ring is a tubular body comprising a conical outer tube surface and an inner tube surface. The central seat hole of the compatible mounting ring has therein a conical surface engaging the conical outer tube surface, to press the synthetic seat ring with its foot surface axially onto the nozzle shoulder surface and with its inner tube surface radially onto an outer nozzle surface. This conical fit between the synthetic seat ring and the mounting ring results in a substantially improved gas tightness, by a combination of a radial and axial sealing forces. Furthermore, this conical fit also reduces the risk of damaging the synthetic seat ring when the valve is subjected to excessive closure forces. It will be appreciated that gas tightness is still further improved, if the conical outer tube surface has a cone apex angle that is slightly bigger than the cone apex angle of the central seat hole of the mounting ring.

The inner ring flange of the mounting ring may bear on a shoulder surface of the seat ring, whereby this inner ring flange applies an axial force onto the seat ring to press the latter onto the nozzle shoulder surface. However, to reduce the risk of damaging the synthetic seat ring, to improve the seating of the mounting ring in the valve body and to better protect the seat ring base against contact with hot gases, it is recommended that the inner ring flange of the mounting ring bears directly on the nozzle shoulder surface. Providing in this case a conical fit for the seat ring in the central seat hole of the seat ring, allows to axially press the seat ring against the nozzle shoulder surface without requiring a ring flange on the foot end of the seat ring. For implementing this solution, the inner ring flange of the mounting ring, which bears directly on the nozzle shoulder surface, advantageously defines a wedge-shaped annular gap with the outer surface of the nozzle, wherein the synthetic seat ring is radially and axially compressed in this wedge-shaped annular gap.

To even further improve protection of the seat ring base against contact with hot gases, the nozzle shoulder surface is advantageously a stepped surface including a first ring shaped shoulder surface forming a support surface for the inner ring flange and a second ring shaped shoulder surface against which the seat ring foot surface is pressed, wherein the second ring shaped shoulder surface lies closer to the front face of the nozzle than the first ring shaped shoulder surface.

In a preferred embodiment of the valve, the mounting ring comprises: a main ring body with several gas passages therein; an inner ring flange in which the synthetic seat ring is mounted; and an outer ring flange supporting the peripheral sealing means. In this embodiment, the peripheral sealing means advantageously comprises: a ring-shaped sealing bead protruding from the outer ring flange into the valve chamber; and a peripheral synthetic seal ring located radially between the sealing bead and a cylindrical valve chamber wall surface; wherein the outer rim of the diaphragm is in sealing engagement with the ring-shaped sealing bead and the peripheral synthetic seal ring. It will be appreciated that this embodiment not only provides an excellent sealing between the diaphragm and the mounting ring, but also between the mounting ring and the exterior wall of the valve chamber.

In a preferred embodiment, the front face of the nozzle is slightly recessed with regard to the seat surface. If "s" is the axial distance between the front face and the seat surface and "t" is the radial wall thickness of the nozzle, then following relation between should advantageously be fulfilled between s and t:

$$0.1<s/t<1.$$

Furthermore, if seat surface has an annular width "w", and "t" is the radial wall thickness of the nozzle, then following relation should advantageously be fulfilled between w and t:

$$0.8<w/t<1.1.$$

It will be appreciated that this ratio w/t close to 1 helps the valve to better withstand adiabatic shock tests with high pressure oxygen.

A valve in accordance with the present invention is advantageously used as a gas cylinder valve or as a shut-off valve for high pressure toxic or corrosive gases, including high pressure oxygen.

BRIEF DESCRIPTION OF THE DRAWINGS

Preferred embodiments of the invention will now be described, by way of example, with reference to the accompanying drawings in which.

DETAILED DESCRIPTION OF A PREFERRED EMBODIMENT

Figures 1, 4:
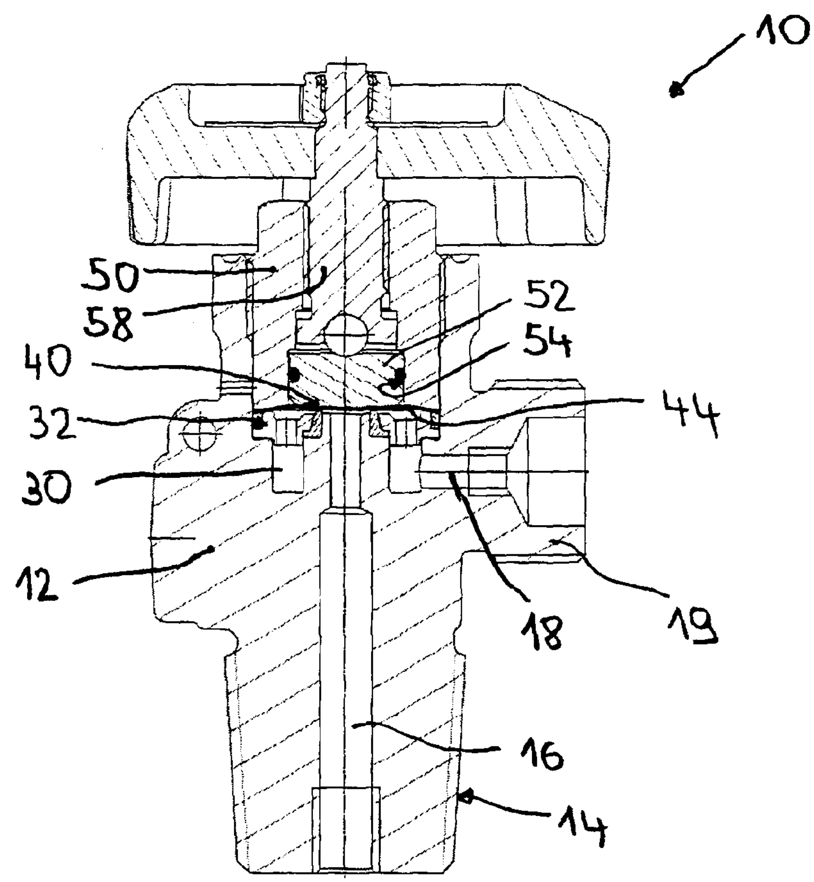
FIG. 1 is a cross sectional of a first embodiment of a valve in accordance with the invention.
FIG. 4 is an enlarged detail of the cross sectional view of FIG. 2.

The valve 10 described—by way of example—with reference to the accompanying drawings, is a high pressure diaphragm shut off valve for equipping e.g. a gas cylinder containing toxic or corrosive gases at high pressures, i.e. pressures higher than 200 bar. It comprises a valve body 12, generally a brass or stainless steel body, with a socket 14 to be screwed into the gas cylinder. This screwed socket 14 has therein a gas inlet channel 16. A gas outlet channel 18 is arranged in a lateral branch 19 of the valve body 12. Both the inlet channel 16 and the outlet channel 18 open into a valve chamber 20 within the valve body 12.

Figure 2:
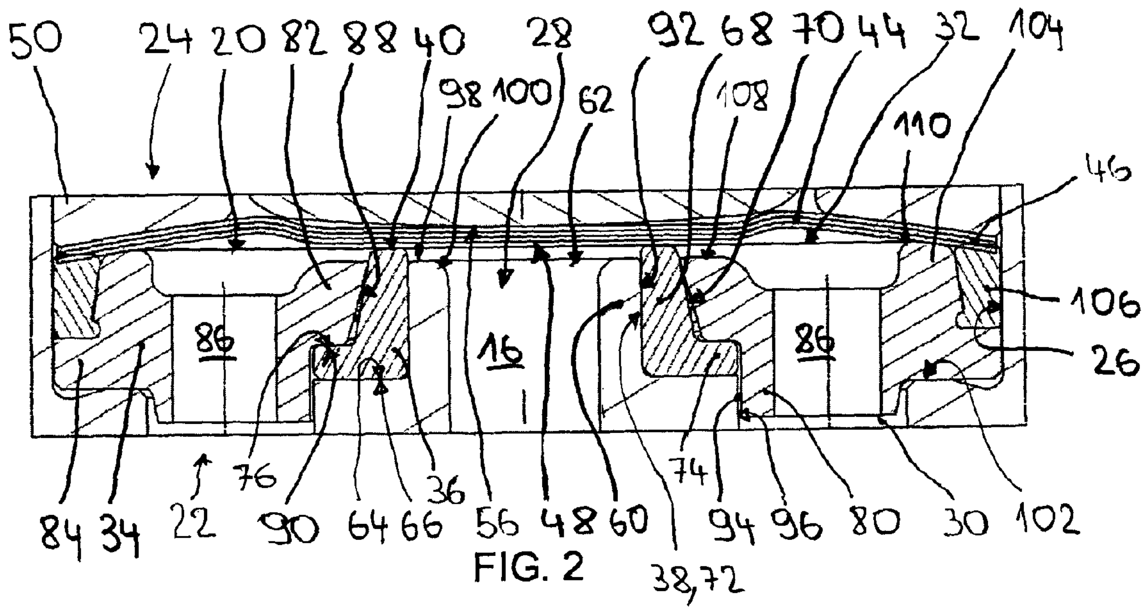
FIG. 2 is an enlarged detail of the cross sectional view of FIG. 1.
Figure 3:
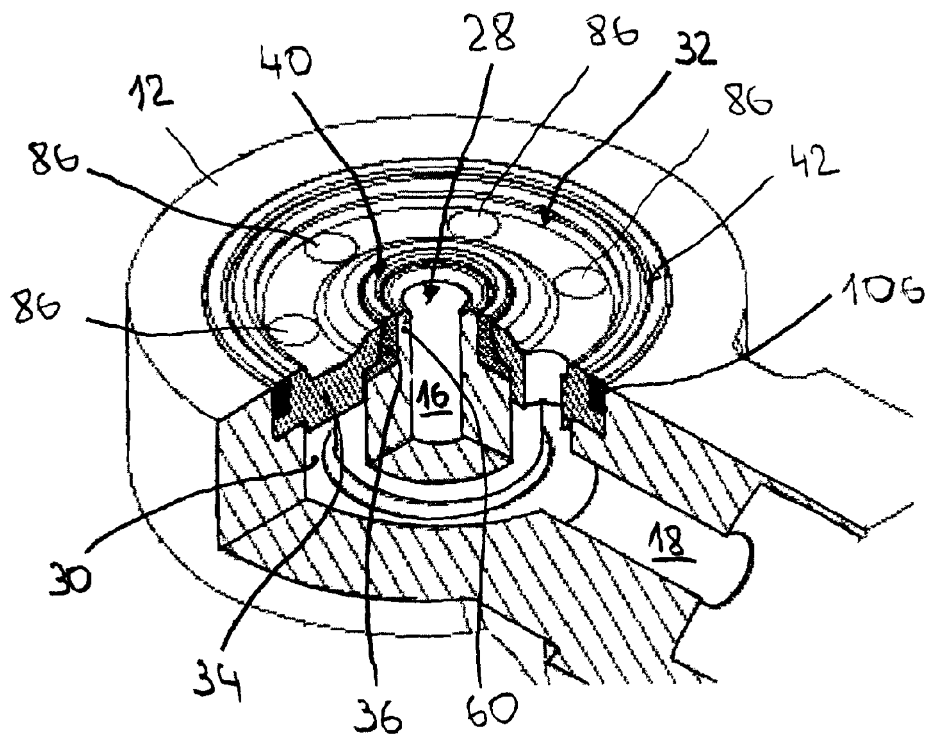
FIG. 3 is a perspective view showing a section through the valve of FIG. 1.

Referring more particularly to FIGS. 2 and 3, it will be noted that the valve chamber 20 is a substantially cylindrical chamber having a first end (see arrow 22 in FIG. 2), a second end (see arrow 24 in FIG. 2), which is axially spaced from the first end 22, and a cylindrical valve chamber wall surface 26. The gas inlet channel 16 forms a first gas port 28, which is centrally arranged in the first end 22 of the valve chamber 20. The gas outlet channel 18 is connected to a gas collecting ring channel 30, which is incorporated into the valve body 12 to form an annular second gas port in the first end 22 of the valve chamber 20, between the first gas port 28 and the cylindrical valve chamber wall 26.

Arrow 32 globally identifies a seat assembly that is removably fitted in the first end 22 of the valve chamber 20. This removable seat assembly 32 comprises a ring shaped mounting ring 34 with a central seat hole, a synthetic seat ring 36 and peripheral sealing means 42. The synthetic seat ring 36, which has a central through hole 38 therein, is mounted into the central seat hole of the ring shaped mounting ring 34, to form a seat surface 40 in the valve chamber 20. The material of the synthetic seat ring 36 is advantageously, but not necessarily, a thermoplastic polymer, preferably of the group of polyamides or polychlorotrifluoroethylenes. The mounting ring 34 is a rigid, generally a metallic body, e.g. a stainless steel or brass body. The peripheral sealing means, which will be described later on, is arranged along an outer rim of the ring shaped mounting ring 34.

Reference number 44 identifies a resilient diaphragm, which seals off said second end 24 of the valve chamber 20. This diaphragm 44 is preferably, but not necessarily, a multilayer diaphragm comprising a plurality of sandwiched flexible metal sheets. It has a central sealing surface 48 adjacent to the seat surface 40 and an outer rim 46 in sealing engagement with the peripheral sealing means 42 of the seat assembly 32. To provide this sealing engagement, a sleeve 50 is e.g. screwed into the valve body 12 so as to press the outer rim 46 of the diaphragm 44 onto the peripheral sealing means 42 of the seat assembly 32.

As is best seen on FIG. 1, an actuator button 52 is mounted into a frontal cavity 54 of the sleeve 50 in axial alignment with the central axis of seat surface 40 in the valve chamber 20. This actuator button 52 is axially guided within the frontal cavity 54 and has a front face 56 that can be brought in contact with the rear side of the diaphragm 44 (see FIG. 2 and FIG. 4). Referring back to FIG. 1, it will be noted that a valve stem 58, which is screwed into the sleeve 50, allows to axially press the actuator button 52—in a manner known per se—in the direction of the seat assembly 32. Doing this, the diaphragm 44, which has initially the form of a concave calotte shell spanning over the seat assembly 32, is resiliently deformed, whereby its central sealing surface 48 is pressed onto the seat surface 40 of the seat assembly 32, thereby sealing off the gas inlet channel 16 from the valve chamber 20 and, consequently, from the gas outlet channel 18. It will be noted that in FIG. 2 and FIG. 4, the central sealing surface 48 is close to the seat surface 40 of the seat assembly 32, but not yet in contact with the latter.

The valve body 12 has, at the first end 22 of the valve chamber 20, a nozzle 60 axially protruding into the valve chamber 20. This nozzle 60 penetrates in a sealed way into the central through hole of the synthetic seat ring 36. The first gas port 28 of the gas inlet channel 16 is arranged in a front face 62 of the nozzle 60. This front face 62 is slightly recessed with regard to the seat surface 40.

The nozzle 60 has a nozzle shoulder surface 64 at its base, which is surrounded by the ring channel 30. The synthetic seat ring 36 has, at the axially opposite side of its seat surface 40, a seat ring foot surface 66 that is pressed by the mounting ring 34 onto the nozzle shoulder surface 64, so as to provide a sealing function between both surfaces 64 and 66.

More particularly, the synthetic seat ring 36 comprises a tubular body 68 with an outer tube surface 70, an inner tube surface 72 delimiting the through hole 38 and a first end forming the seat surface 40. The inner tube surface 72 is a cylindrical surface, which is conceived to be in sealing contact with a cylindrical outer surface 92 of the nozzle 60. The outer tube surface 70 is a conical surface with a cone apex angle of about 30°. An opposite second end of the tubular body 68 is equipped with a radially extending ring shaped seat ring flange 74, which has a seat ring flange shoulder surface 76 thereon.

The mounting ring 34 comprises a main ring body 80, a inner ring flange 82 and a outer ring flange 84. The main ring body 80 penetrates into the ring channel 30 and has several gas passages 86 therein, through which gas may flow from the inner valve chamber 20 into the gas collecting ring channel 30. The synthetic seat ring 36 is mounted into a central seat hole in the inner ring flange 82, so that its conical outer tube surface 70 is in sealing contact with a lateral conical surface 88 of the inner ring flange 82, and so that its seat ring flange shoulder surface 76 is in sealing contact with a shoulder surface 90 of the inner ring flange 82. Looking at FIG. 2 and FIG. 4, in which the conical outer tube surface 70 is shown in its original state (i.e. prior to mounting the synthetic seat ring 36 into the inner ring flange 82 and prior to the insertion of the nozzle 60 into the synthetic seat ring 36), it will be noted that the cone apex angle of this outer tube surface 70 is slightly bigger than the cone apex angle of the lateral conical surface 88 of the inner ring flange 82. This difference in the cone apex angles warrants higher contact pressures, in particular between the inner tube surface 72 of synthetic seat ring 36 and the cylindrical outer surface 92 of the nozzle 60, near the nozzle shoulder surface 64. Thus, an excellent tightness against high pressure gas leakage between the synthetic seat ring 36 and the valve body 12 is achieved.

Referring to FIG. 2 or FIG. 4, it will be noted that the synthetic seat ring 36 is confined within a seat ring chamber delimited radially to the inside by the cylindrical outer surface 92 of the nozzle 60, radially to the outside by the lateral conical surface 88 of inner ring flange 82 and by the main body 80 of the mounting ring 34 penetrating into the ring channel 30, and axially by the nozzle shoulder surface 64. Only the first end of the tubular body 68 protrudes out of this seat ring chamber. As shown in FIGS. 1 to 4, the main body 80 of the mounting ring 34 may have an axial extension slightly penetrating into the ring channel 30. This axial extension first covers the seat ring flange 74 and forms thereafter a very narrow annular air gap 94 with a cylindrical inner wall surface 96 of the ring channel 30. In summary, with the exception of the seat surface 40 itself, all surfaces of the synthetic seat ring 36 are well protected against deformation and against direct contact with a high velocity gas stream flowing through the open valve 10.

Referring more particularly to FIG. 4, it will be noted that the nozzle 60 forms a relatively thick metallic protecting rim 98 with a rounded outlet edge 100 close to the seat surface 40. In fact, the space "s" between the front face 62 of the nozzle 60 and the seat surface 40 is less than the wall thickness "t" of the nozzle 60 at the first gas port 28 (in the valve 10, $s/t \approx 0.3$); and the wall thickness "t" of the nozzle 60 is about equal to the width "w" of the seat surface 40. When the valve 10 is opened, this metallic protecting rim 98 deviates the high velocity gas stream streaming out of the gas inlet channel 16 in such a way that a direct contact of this "sharp" stream with the synthetic sealing surface 40 is largely avoided. It will be appreciated that this feature is particularly important if the valve 10 is used e.g. with high pressure oxygen, i.e. if there is a risk of so called adiabatic shocks in the seat area.

Another important feature of the valve with regard to good results in adiabatic shock tests with high pressure oxygen, is the generously dimensioned gas collecting ring channel 30 surrounding the nozzle 60 at its base (see FIGS. 1 and 3). This large volume channel 30 at the base of the nozzle 60, warrants indeed a better cooling of the nozzle 60 and its shoulder surface 64, thereby reducing the risk that the metallic surfaces in contact with the synthetic seat ring 36 overheat in such adiabatic shock tests to an extent which damages the synthetic seat ring 36.

Referring again to FIG. 2, it will be noted that the mounting ring 34 rests with its outer ring flange 84 on an outer shoulder surface 102, which surrounds the ring channel 30. This outer ring flange 84 supports the aforementioned peripheral sealing means 42, which comprises more particularly a ring-shaped sealing bead 104 and a peripheral synthetic seal ring 106. The ring-shaped sealing bead 104 protrudes from the outer ring flange 84 into the valve chamber 20. The peripheral synthetic seal ring 106 is located radially between the sealing bead 104 and the cylindrical valve chamber wall surface 26. The material of the synthetic seat ring 106 is advantageously, but not necessarily, a thermoplastic polymer, preferably of the group of polyamides or polychlorotrifluoroethylenes.

The sleeve 50 presses the outer rim 46 of the diaphragm 44 onto the ring-shaped sealing bead 104, whereby the peripheral synthetic seal ring 106 is axially compressed. Due to this axial compression, the synthetic seal ring 106 is also radially pressed on one side against sealing bead 104 and on the other side against the cylindrical valve chamber wall surface 26. Consequently, the synthetic seal ring 106 provides not only an improved sealing function between the diaphragm 44 and the mounting ring 34, but also an additional sealing function between the outer ring flange 84 of the mounting ring 34 and the valve chamber wall surface 26. It remains to be noted that the outer shoulder surface 102 forms a kind of axial stop face for the mounting ring 34. This axial stop face is dimensioned so that the inner ring flange 82 of the mounting ring 34 slightly compresses the synthetic seat ring flange 74 when the sleeve 50 presses the outer ring flange 84 of the mounting ring 34 firmly onto the outer shoulder surface 102.

Still referring to FIG. 2, it will be noted that the inner ring flange 82 of the mounting ring 34 has a front face 108 lying in a first plane, which contains the front face 62 of the nozzle 60. Furthermore, the ring-shaped sealing bead 104 has a annular crest surface 110 lying in a second plane, which contains the seat surface 40; wherein said first plane lies behind said second plane, when viewed in the direction the central sealing surface 48 of the diaphragm 44 is pressed onto the seat surface 40 of the seat assembly 32.

Figure 5:
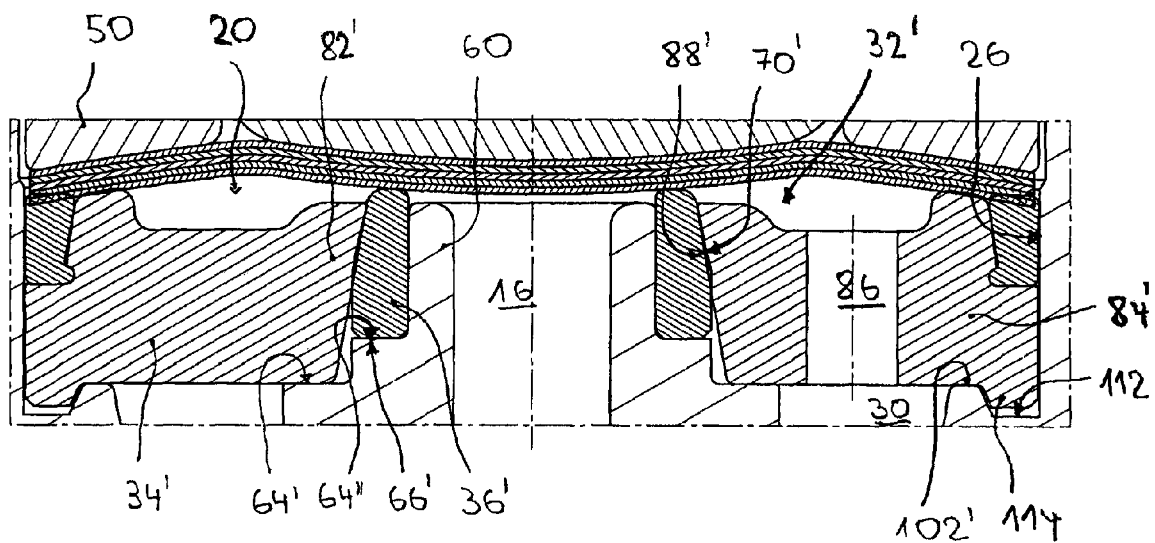
FIG. 5 is a cross sectional view of a seat assembly in a second embodiment of a valve in accordance with the invention.
Figure 6:
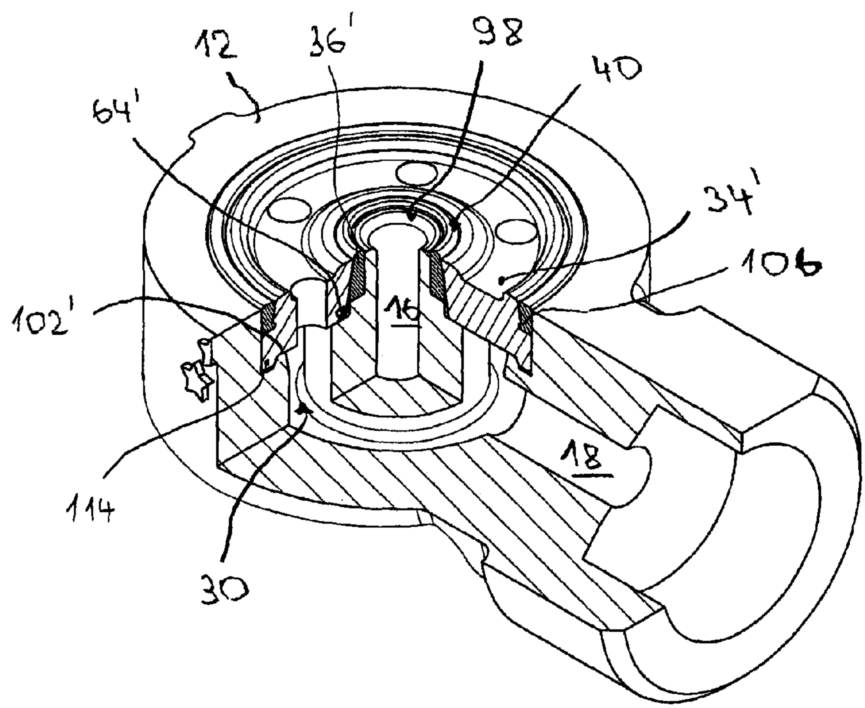
FIG. 6 is a perspective view of the embodiment shown in FIG. 5.

Referring now to FIG. 5 and FIG. 6, further aspects and improvements of a valve in accordance with the invention will be described. It will first be noted that the synthetic seat ring 36' does not comprise a seat ring flange. It is a tubular body with a conical outer tube surface 70' that forms a conical fit with the lateral conical surface 88' of the inner ring flange 82' of the mounting ring 34'. As described already hereinbefore, the cone apex angle of the outer tube surface 70' is preferably slightly bigger than the cone apex angle of the lateral conical surface 88' of the inner ring flange 82'. The equivalent of nozzle shoulder surface 64 in FIG. 2 is in FIG. 5 a stepped surface 64', 64", including a first ring shaped shoulder surface 64', which forms a seat for the inner ring flange 82', and a second ring shaped shoulder surface 64", against which the seat ring foot surface 66' is pressed by the mounting ring 34'. The required contact pressure between the seat ring foot surface 66' and the second ring shaped shoulder surface 64" is, in this embodiment, solely generated by the conical fit of the seat ring 36' in the central seat hole of the mounting ring 34', when the sleeve 50 presses the mounting ring 34' into the valve chamber 20. In FIG. 5, one sees indeed that the inner ring flange 82' of the mounting ring 34', which directly bears on the first ring shaped shoulder surface 64', defines with the nozzle 60 a wedge-shaped annular gap in which the synthetic seat ring 36' is radially and axially compressed. It will be appreciated that this design considerably improves the valve. For example: there is no seat ring flange 74 that may be excessively compressed or damaged; the seating of the mounting ring 34' in the valve chamber 20 is improved; gas tightness is even further improved; and the seat ring base is even better protected against overheating in case of adiabatic shock tests.

It will further be noted that the outer shoulder surface 102', on which the outer ring flange 84' of the mounting ring 34' bears, is separated from the cylindrical valve chamber wall surface 26 by a deeper annular groove 112. The ring flange 84' of the mounting ring 34' has along its outer border a protruding rim 114, which is received in the annular groove 112. Normally, there is a small axial clearance between the protruding rim 114 and the bottom surface of the annular groove 112, as shown in FIG. 5. However, if the sleeve 50 is tightened with an excessive torque, this clearance disappears, and the protruding rim 114 finally abuts upon the bottom surface of the annular groove 112, thereby preventing excessive deformations of the seat assembly 32' and of the shoulder surfaces 64', 102' of the valve body 12 on which the mounting ring 34' bears.

The invention claimed is:

1. A high pressure diaphragm gas valve comprising:

a valve body with a valve chamber of generally cylindrical configuration therein, said valve chamber having a first end and a second end that is axially spaced from said first end, and a nozzle axially protruding from said first end into said valve chamber, wherein a first gas port is arranged in a front face of said nozzle and a second gas port is arranged in said first end laterally of said nozzle;

a seat assembly removably fitted in said first end of said valve chamber, said seat assembly including:

a mounting ring with a central seat hole, an inner flange, a main ring body with gas passages therein and an outer ring flange;

a synthetic seat ring fitted in said central seat hole of said mounting ring, said synthetic seat ring having a central through hole therein and a front face forming a seat surface in said valve chamber around said first gas port, said nozzle penetrating in a sealed way into said central through hole of said synthetic seat ring, which has at the opposite side of said seat surface, a seat ring foot surface that is pressed by said mounting ring onto said nozzle shoulder surface; and peripheral sealing means along said outer ring flange of said mounting ring;

a diaphragm sealing off said second end of said valve chamber, wherein said diaphragm has a central sealing surface and an outer rim in sealing engagement with said peripheral sealing means of said seat assembly; and means for pressing said central sealing surface of said diaphragm onto said seat surface of said seat assembly;

wherein said second gas port is formed by a gas collecting ring channel incorporated into said valve body wherein it surrounds said nozzle shoulder surface and is itself surrounded by an outer shoulder surface of the valve body; and said mounting ring is supported with its inner ring flange on said nozzle shoulder surface and with its outer ring flange on said outer shoulder surface, so that said at least one peripheral gas passage opens into said ring channel.

2. The valve as claimed in claim 1, wherein:

said front face of said nozzle is slightly recessed with regard to said seat surface, so as to provide a mechanical stop for said central sealing surface of said diaphragm close to said seat surface.

3. The valve as claimed in claim 2, wherein:

said synthetic seat ring is a tubular body comprising a conical outer tube surface and an inner tube surface; and said central seat hole of said mounting ring is delimited by a conical surface, which engages said conical outer tube surface to press said synthetic seat ring with its foot surface onto said nozzle shoulder surface and with its inner tube surface onto an outer nozzle surface.

4. The valve as claimed in claim 3, wherein:

said conical outer tube surface has a cone apex angle that is slightly bigger than the cone apex angle of said central hole of said mounting ring.

5. The valve as claimed in claim 1, wherein said peripheral sealing means comprises:

a ring-shaped sealing bead protruding from said outer ring flange into said valve chamber; and a peripheral synthetic seal ring located radially between said sealing bead and a cylindrical valve chamber wall surface;

wherein said outer rim of said diaphragm is in sealing engagement with said ring-shaped sealing bead and said peripheral synthetic seal ring.

6. The valve as claimed in claim 5, comprising:

a sleeve mounted into said valve body so as to press said outer rim of said diaphragm onto said ring-shaped sealing bead (104) and said peripheral synthetic seal ring;

wherein said means for pressing said central sealing surface of said diaphragm onto said seat surface of said seat assembly are mounted into said sleeve.

7. The valve as claimed in claim 5, wherein:

said inner ring flange has a front face which lies in a first plane containing said front face of said nozzle;

said ring-shaped sealing bead has an annular crest which lies in a second plane containing said seat surface; and said first plane lies behind said second plane, when viewed in the direction said central sealing surface of said diaphragm is pressed onto said seat surface of said seat assembly.

8. The valve as claimed in claim 1, wherein:

said front face of said nozzle, when the valve is open, slightly recessed with regard to said seat surface, wherein s is the distance between said front face and said seat surface;

said nozzle has a wall thickness t at the first gas port, wherein $0,1<s/t<1$.

9. The valve as claimed in claim 1, wherein:

said nozzle has a wall thickness t at the first gas port; said seat surface has an annular width w, and $0,8<w/t<1,1$.

10. The valve as claimed in claim 1, wherein:

said inner ring flange of said mounting ring directly bears on said nozzle shoulder surface, and a conical fit is provided for the seat ring in the central seat hole of the mounting ring.

11. The valve as claimed in claim 1, wherein:

said inner ring flange of said mounting ring directly bears on said nozzle shoulder surface and defines with said nozzle a wedge-shaped annular gap in which said synthetic seat ring is compressed.

12. The valve as claimed in claim 1, wherein:

said nozzle shoulder surface is a stepped surface including a first ring shaped shoulder surface forming a support surface for said inner ring flange and a second ring shaped shoulder surface against which said seat ring foot surface is pressed, wherein said second ring shaped shoulder surface lies closer to said front face of said nozzle than said first ring shaped shoulder surface.

13. The valve as claimed in claim 1, wherein:

said outer shoulder surface is separated from the valve chamber wall by an annular groove; and said outer ring flange has along its outer border a protruding outer rim, which is received in said annular groove.

14. A high pressure diaphragm gas valve comprising:

a valve body with a valve chamber of generally cylindrical configuration therein, said valve chamber having a first end and a second end that is axially spaced from said first end, and a nozzle axially protruding from said first end into said valve chamber, wherein a first gas port is arranged in a front face of said nozzle and a second gas port is arranged in said first end laterally of said nozzle;

a seat assembly removably fitted in said first end of said valve chamber, said seat assembly including:

a mounting ring with a central seat hole, an inner flange, a main ring body with gas passages therein and an outer ring flange;

a synthetic seat ring fitted in said central seat hole of said mounting ring, said synthetic seat ring having a central through hole therein and a front face forming a seat surface in said valve chamber around said first gas port, said nozzle penetrating a sealed way into said central through hole of said synthetic seat ring, which has at the opposite side of said seat surface, a seat ring foot surface that is pressed by said mounting ring onto said nozzle shoulder surface; and peripheral sealing means along said outer ring flange of said mounting ring;

a diaphragm sealing off said second end of said valve chamber, wherein said diaphragm has a central sealing surface and an outer rim in sealing engagement with said peripheral sealing means of said seat assembly; and means for pressing said central sealing surface of said diaphragm onto said seat surface of said seat assembly;

wherein said inner ring flange is directly supported on said nozzle shoulder surface and defines with said nozzle a wedge-shaped annular gap in which said synthetic seat ring is radially and axially compressed.

15. The valve as claimed in claim 14, wherein:

said synthetic seat ring is a tubular body comprising a conical outer tube surface and an inner tube surface; and said central seat hole of said mounting ring is delimited by a conical surface, which engages said conical outer tube surface to press said synthetic seat ring with its foot surface onto said nozzle shoulder surface and with its inner tube surface onto an outer nozzle surface.

* * * * *